US008559517B2

(12) United States Patent  
Ogino et al.

(10) Patent No.: US 8,559,517 B2
(45) Date of Patent: Oct. 15, 2013

(54) IMAGE PROCESSING APPARATUS AND IMAGE DISPLAY APPARATUS PROVIDED WITH THE SAME

(75) Inventors: Masahiro Ogino, Ebina (JP); Mitsuo Nakajima, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 1118 days.

(21) Appl. No.: 12/004,959

(22) Filed: Dec. 21, 2007

(65) Prior Publication Data

US 2008/0170161 A1    Jul. 17, 2008

(30) Foreign Application Priority Data

Dec. 28, 2006  (JP) ................................. 2006-353693

(51) Int. Cl.
*H04N 11/20* (2006.01)

(52) U.S. Cl.
USPC ....... 375/240.16; 348/441; 370/390; 370/465

(58) Field of Classification Search
USPC ........ 375/240.01, 240.16; 348/441, 448, 699; 370/390, 465, 469, 473
See application file for complete search history.

(56) References Cited

U.S. PATENT DOCUMENTS

| | | | |
|---|---|---|---|
| 6,900,846 B2 * | 5/2005 | Lee et al. | 348/459 |
| 7,020,197 B2 | 3/2006 | Tanase et al. | |
| 2004/0252230 A1 * | 12/2004 | Winder | 348/402.1 |
| 2009/0073311 A1 | 3/2009 | Hamada et al. | |

FOREIGN PATENT DOCUMENTS

| | | |
|---|---|---|
| JP | 04-323988 A | 11/1992 |
| JP | 2001-024988 | 1/2001 |
| JP | 2002027414 | 1/2002 |
| JP | 2002-359775 A | 12/2002 |
| JP | 2003-163849 | 6/2003 |
| JP | 2005-167887 A | 6/2005 |
| JP | 2006-270823 | 10/2006 |
| WO | 2006/117878 A1 | 11/2006 |

OTHER PUBLICATIONS

China State Intellectual Property Office (SIPO) office action for SIPO patent application 2007101605656 (Dec. 11, 2009).
Japan Patent Office (JPO) office action for JPO patent application JP2006-353693 (Apr. 24, 2009).

* cited by examiner

*Primary Examiner* — Ian N Moore
*Assistant Examiner* — Mon Cheri Davenport
(74) *Attorney, Agent, or Firm* — Kilpatrick Townsend & Stockton LLP

(57) ABSTRACT

A picture signal processing apparatus includes a motion vector detecting unit for detecting information as to a motion vector of a picture from frames contained in an input picture signal; an interpolation frame producing unit for producing an interpolation frame by employing the motion vector; and a frame stream producing unit for producing a picture signal of a new frame stream by combining the interpolation frame produced with the frames of the input picture signal so as to output the produced picture signal of the new frame stream. When the picture signal processing apparatus performs a converting operation in such a manner that interpolation frames are continued between two frames of the input picture signal, at least one interpolation frame among the interpolation frames is formed as such an interpolation frame formed without employing the motion vector (namely, not depending upon motion of picture).

2 Claims, 12 Drawing Sheets

| | -5 | -4 | -3 | -2 | -1 | 0 | 1 | 2 | 3 | 4 | 5 |
|---|---|---|---|---|---|---|---|---|---|---|---|
| -2 | 1 | 58 | 455 | 985 | 2653 | 546 | 20896 | 522 | 652 | 25 | 44 |
| -1 | 8 | 96 | 21 | 255 | 5403 | 21249 | 47440 | 8466 | 2836 | 74 | 51 |
| 0 | 83 | 65 | 55 | 451 | 10254 | 55058 | 18496 | 22944 | 1485 | 99 | 24 |
| 1 | 595 | 4 | 968 | 2657 | 8793 | 27074 | 31488 | 10647 | 54 | 45 | 66 |
| 2 | 65 | 55 | 258 | 24 | 4556 | 5456 | 25230 | 599 | 889 | 999 | 58 |

FIG.21

| PROGRAM GENRE | JUDGING SIGNAL |
|---|---|
| NEWS / REPORTS | 0 |
| SPORTS | 0 |
| INFORMATION WIDE SHOW | 0 |
| DRAMA | 0 |
| MUSIC | 0 |
| VARIETY SHOW | 0 |
| MOVIES | 1 |
| ANIMATIONS / SPECIAL PHOTOGRAPHING PROGRAMS | 1 |

IMAGE PROCESSING APPARATUS AND IMAGE DISPLAY APPARATUS PROVIDED WITH THE SAME

INCORPORATION BY REFERENCE

The present application claims priority from Japanese application JP2006-353693 filed on Dec. 28, 2006, the content of which is hereby incorporated by reference into this application.

BACKGROUND OF THE INVENTION

The present invention generally relates to a picture processing apparatus and a picture display apparatus equipped with the image processing apparatus. More specifically, the present invention is directed to an image processing apparatus equipped with an arrangement for converting a frame rate of an input image signal, and also to an image display apparatus provided with the above-described image processing apparatus.

Very recently, as techniques capable of improving display performance of moving pictures, a so-called "frame rate conversion" technical idea has been proposed. This "frame rate conversion" technique is capable of producing a signal having a new frame stream by combining a plurality of frames contained in an input picture signal with interpolation frames which are produced inside the own apparatus by using motion vectors of the input picture signal. As a result, unnatural motion (for example, feelings of "after image" and wobbling feelings) occurred in displays of motion pictures can be improved, so that the performance capable of representing moving pictures can be improved.

In order to improve the moving picture display performance, interpolation frames must be produced in high precision. To this end, it is necessarily require to improve detecting precision as to motion vectors which are employed so as to produce these interpolation frames. As to conventional techniques capable of improving the detecting precision for the motion vectors, for instance, JP-A-2002-27414 (refer to paragraph "0009" and FIG. 9) has been disclosed.

SUMMARY OF THE INVENTION

However, the above-described conventional technical ideas have never considered such an image that a plurality of motion are present within one screen, and furthermore, another image in which a plurality of moving objects are intersected with each other. It is practically difficult to acquire correct motion vectors with respect to these moving objects present in the above-described image, namely, erroneous detections of these motion vectors may readily occur, and thus, interpolation frames can be hardly produced in higher precision. As a result, collapse may occur in pictures after frame rates have been converted. In this case, the above expression "collapse of pictures" has the following implication: That is, such pictures having no relationship, or a low correlation with respect to motion of original pictures (namely, input picture signals) appear in the original pictures. When appearing frequencies of these "collapse of pictures" become high, the "collapse of pictures" may become conspicuous.

The present invention has been made to solve the above-described problems, and therefore, has an object to provide a frame rate converting technique capable of acquiring pictures having high image qualities by reducing the above-described "collapse of pictures."

In order to achieve the above-described object, a picture processing apparatus and a picture display apparatus, according to the present invention, are featured by employing structural elements described in the scope of claim for a patent.

For example, in the case that a plurality of interpolation frames are inserted between 2 frames contained in an input picture signal, or an original frame between these 2 frames is replaced by a plurality of interpolation frames, the interpolation frames continuously appear in a temporal manner. At this time, when motion of moving objects contained in the original picture is complex, motion vectors of these moving objects can be hardly detected in a correct manner. As a result, the so-termed "collapse of pictures" may easily occur. As a consequence, if the above-described frame rate conversion is carried out in such a case that the motion of the pictures is complex, then such interpolation frames having the large "collapse of pictures" continuously appear in the temporal manner. Accordingly, the above-described "collapse of pictures" may further conspicuously appear.

Under such a circumstance, the picture processing apparatus and the picture display apparatus, according to the present invention, have the following featured technical ideas: That is, as previously explained, when a frame rate conversion is carried out in such a manner that the plurality of interpolation frames are continued between the two frames of the input picture signal, at least one interpolation frame within these plural interpolation frames is made of such an interpolation frame formed without employing a motion vector, namely, this interpolation frame is produced, while does not depend upon the motion of the picture.

In accordance with the present invention, while the effect of improving the moving picture quality achieved by the frame rate converting operation can be maintained, such pictures containing the less "collapse of pictures" can be acquired.

Other objects, features and advantages of the invention will become apparent from the following description of the embodiments of the invention taken in conjunction with the accompanying drawings.

BRIEF DESCRIPTION OF THE DRAWINGS

FIG. 21 is a diagram for indicating one structural example of an interpolation frame producing unit employed in the fourth embodiment.

DETAILED DESCRIPTION OF THE INVENTION

Referring now to drawings, a description is made of various embodiments of the present invention with reference to drawings.

First Embodiment

Figure 1:
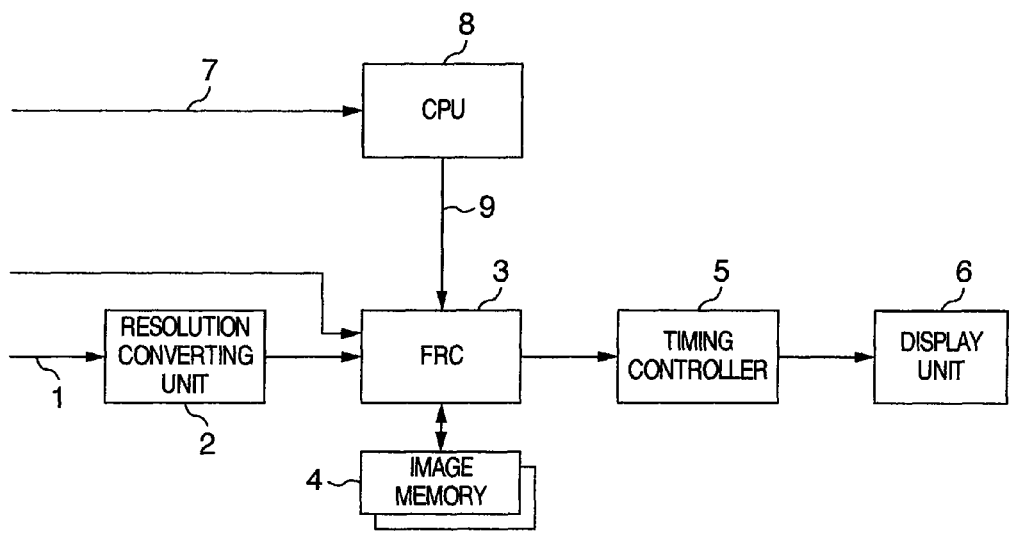
FIG. 1 is a block diagram for indicating an arrangement of an image processing apparatus according to a first embodiment of the present invention.

FIG. 1 is a block diagram for representing an example as to an arrangement of an image processing apparatus according to a first embodiment of the present invention. In FIG. 1, an input picture signal 1 is, for instance, a digital television broadcasting signal, and it is so assumed that the input picture signal 1 is constructed of a TS (Transport Stream). The input picture signal 1 is firstly entered to a resolution converting circuit 2, and thus, a pixel number converting operation along a vertical direction and/or a horizontal direction is carried out by the resolution converting unit 2 with respect to the input picture signal 1. Since this pixel number converting process operation does not constitute a gist of the first embodiment, a detailed description thereof is omitted. However, such a filtering process operation is carried out in order that, for example, the pixel numbers of the input picture signal along the vertical direction and the horizontal direction are equal to pixel numbers of a display unit 5 along the vertical direction and the horizontal direction. An output signal from the resolution converting unit 2 is entered to a frame rate converting unit (will be referred to as "FRC: Frame Rate Conversion" hereinafter) 3 which constitutes a feature portion of the first embodiment, and then, a frame rate conversion (will be discussed later) is carried out. For instance, in the case that an input picture signal has a non-pull down format (normal format) and a frame rate (frame frequency) is 60 Hz, the FRC 3 converts this frame rate in such a manner that interpolation frames produced within the FRC 3 are inserted into the respective frames of this input picture signal so as to output a new frame stream having a frame rate of 120 Hz. Also, in such a case that an input picture signal has a 2-to-3 pull down format and a frame rate (frame frequency) of this input picture signal is 60 Hz, since the FRC 3 replaces several frames within the picture signal having this 2-to-3 pull down format by interpolation frames produced within the FRC 3, the FRC 3 outputs such a new frame stream having a frame rate of 60 Hz, whose motion has been smoothed.

In this case, the above-described "2-to-3 pull down" corresponds to one of systems for converting pictures photographed at a speed of 24 frames/second (for example, movie film) into 60 frames (fields). Concretely speaking, the above-described picture constructed of the 24 frames is converted into a picture having 60 frames in such a manner that 2 frames (fields) of odd-numbered frames of the above-described picture having the 24 frames are continuously repeated, and 3 frames (fields) of even-numbered frames thereof are continuously repeated. For example, in such a case that the above-described picture having the 24 frames are arranged by A, B, C, - - -, the resulting picture becomes AA, BBB, CC, - - -, by performing the 2-to-3 pull down. It should also be noted that although such a picture signal having a 2-to-2 pull down format is also present, descriptions thereof will be omitted in the first embodiment.

In this first embodiment, any of the frame rate of the 2-to-3 pull down format picture signal and the frame rate of the new frame stream is not changed at 60 Hz. However, in the first embodiment, for the sake of convenient explanations, it is so assumed that the 2-to-3 pull down type picture signal is handled as such a picture signal having a frame rate of 24 Hz. Also, it is so assumed that the process operation for converting the 2-to-3 pull down type picture signal in the above-described manner is handled as one of frame rate converting process operations, although the frame rate is not changed.

An image memory 4 stores thereinto a signal of an original frame. While the FRC 3 accesses the image memory 4, the FRC 3 performs the above-described interpolation frame forming operation. Also, the image memory 4 stores thereinto the formed interpolation frame. While the FRC 3 accesses the image memory 4, the FRC 3 combines the stored original frame with the interpolation frame so as to output a picture signal of the above-described new frame stream.

Also, a method for producing an interpolation frame executed in the FRC 3 is changed in response to a format (namely, either 2-to-3 pull down format or not) of an input picture signal, or a frame rate converting process operation.

In order to judge whether or not an input picture signal has a 2-to-3 pull down format, for instance, a flag 7 indicative of a format of the input picture signal is inputted to a CPU 8 corresponding to a control circuit. The CPU 8 judges a sort of a format of an input picture signal based upon the flag 7. As this flag 7, for example, a header contained in a TS (transport stream) of a digital television signal may be employed. In other words, a format of an input picture signal, for instance, such an information as resolution and an aspect ratio may be contained in the header of the TS, and furthermore, another information for indicating whether this picture signal corresponds to a 2-to-3 pull down format, or not may be contained therein. In the first embodiment, the information related to the pull down format contained in the header is employed as the above-described flag 7. In the case where this flag 7 cannot be detected, it is alternatively possible to judge whether or not the relevant picture signal is a 2-to-3 pull down type of picture signal based upon a change of this picture signal. For instance, when a detection is made of a difference in picture signals at specific positions of respective frames, and then, the above-explained array of AA, BBB, and CC is detected from the detected difference, it is also possible to judge that the relevant picture signal corresponds to a picture signal having the 2-to-3 pull down format.

The CPU 8 outputs an FRC converting mode signal 9 which is used to judge whether or not a format of an input picture signal corresponds to the 2-to-3 pull down format based upon the above-described flag 7, or the like so as to control the converting process operation of the FRC 3. In other words, the CPU 8 controls the FRC 3 in such a manner that if an input picture signal is such a picture signal having a non-pull down format, then the FRC 3 produces an interpolation frame using a motion vector, or if an input picture signal is such a picture signal having a 2-to-3 pull down format, then the FRC 3 produces such an interpolation frame without employing a motion vector (namely, frame forming does not depend upon motion of picture). A detailed description of the FRC converting mode signal 9 will be made later.

A new frame stream signal outputted from the FRC 3 is supplied via a timing controller 5 to a display unit 6 which is constituted by a flat panel, for example, a PDP (Plasma Display Panel), or an LCD (Liquid Crystal Display). The timing controller 5 supplies an output signal from the FRC 3 to the display unit 6 in response to timing of a horizontal scanning operation and timing of a vertical scanning operation, so that a picture whose frame rate has been converted is displayed on the screen of the display unit 6.

Figure 2:
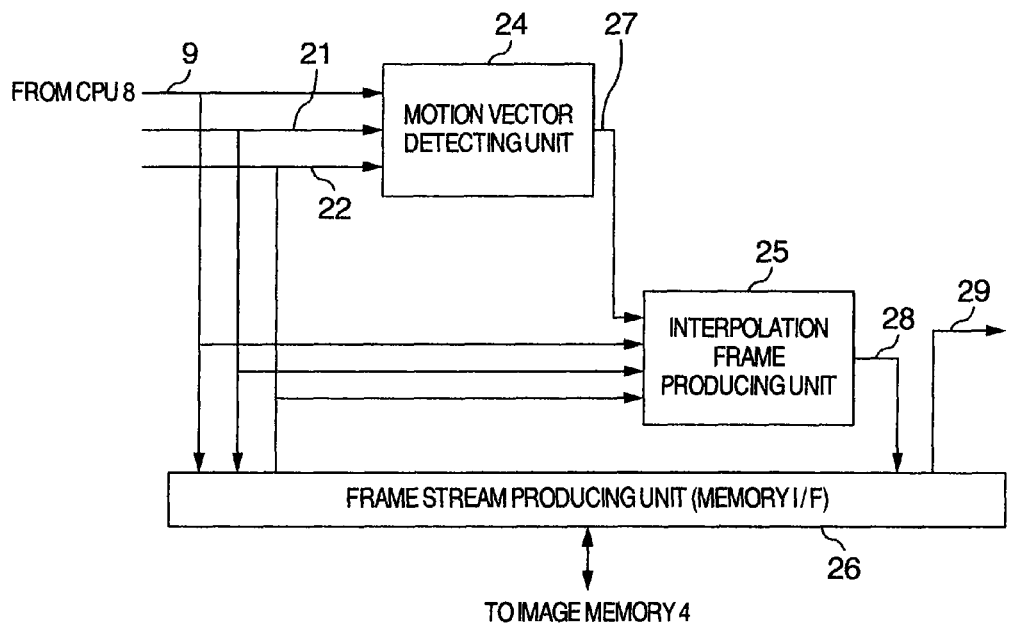
FIG. 2 shows a structural example of an FRC (Frame Rate Conversion) 3 employed in the image processing apparatus.

Next, a description is made of one example as to an internal arrangement of the above-described FRC 3 with reference to FIG. 2. The FRC 3 is equipped with a motion vector detecting unit 24. A present frame signal 21 and a preceding frame signal 22 which temporally precedes the present frame signal 21 by 1 frame are inputted to the motion vector detecting unit 24 so as to detect a motion vector of a picture from these frame signals 21 and 22. Also, the above-described FRC converting mode signal 9 from the CPU 8 is entered to the motion vector detecting circuit 24 so as to change a detection mode of a motion vector in response to the status of this FRC converting mode signal 9. It should also be noted that the present frame signal 21 is written into the image memory 4 via a memory I/F (interface) 26 for controlling a writing operation with respect to the image memory 4. The memory I/F 26 also has another function of a frame stream producing unit. That is, since the memory I/F 26 controls a reading operation with respect to the image memory 4, the frame stream producing unit 26 produces a new frame stream by combining an original frame with an interpolation frame.

Figure 3:
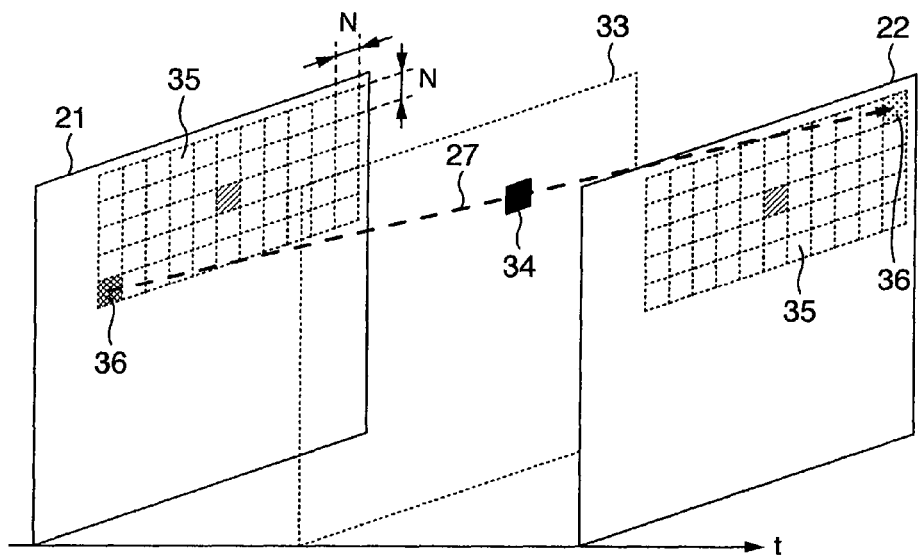
FIG. 3 is a diagram for representing one example as to an interpolation frame production by a block matching method.

As previously described, the motion vector detecting unit 24 detects a motion vector 27 based upon the present frame signal 21 and the preceding frame signal 22. As this detecting method, for example, any one of a block matching method, a gradient method, a phase correlative method, and the like may be employed. In this first embodiment, for example, it is so assumed that such an N×N (symbol "N" being integer) block matching method as represented in FIG. 3 is employed. Referring now to FIG. 3, one example of the block matching method will be described.

FIG. 3 exemplifies such a case that an interpolation frame 33 is produced from the present frame signal 21 corresponding to a first frame contained in the input picture signal, and the preceding frame signal 22 contained in this input picture signal, while the interpolation frame signal 33 is inserted between both the frames. When an interpolation (interpolation pixel is formed) is tried to be performed as to a subject block (alternatively, 1 pixel) 34 on the interpolation frame 33, a retrieving range 35 made of a predetermined block number and indicated by a dot line in FIG. 3 is provided with respect to each of the present frame signal 21 and the preceding frame signal 22, while such a block located at the same spatial position with respect to the subject block 34 is set as a center. In the exemplification of FIG. 3, this retrieving range 35 has been set as horizontal 11 blocks and vertical 5 blocks. Next, while the subject block 34 is set as the center, such blocks on the present frame signal 21 and the preceding frame number 22 are extracted as one set of blocks, which are present at positions having a point symmetrical relationship along the temporal direction. The extracting operation for the block pair is carried out with respect to all of blocks contained in the retrieving range 35, and then, a calculation is made of difference values between the respective block pairs. Thereafter, a block pair 36 whose difference value is the smallest value is detected, and then, a direction of a straight line which connects this block pair 36 with each other is detected as a motion vector 27 (such processing operation will be referred to as "difference value matching calculation" hereinafter).

The motion vector 27 detected in the above-described method is entered to an interpolation frame producing unit 25. The interpolation frame producing unit 25 calculates pixel values of the subject block 34 contained in the interpolation frame 33 as an average value of pixel values of such a block pair (namely, indicated by motion vector 27), the difference value of which becomes the minimum value. An interpolation pixel contained in the interpolation frame 33 may be obtained in the above-described manner. This process operation is carried out with respect to all of pixels contained in the interpolation frame 33, so that one sheet of the interpolation frame is accomplished.

Figure 4:
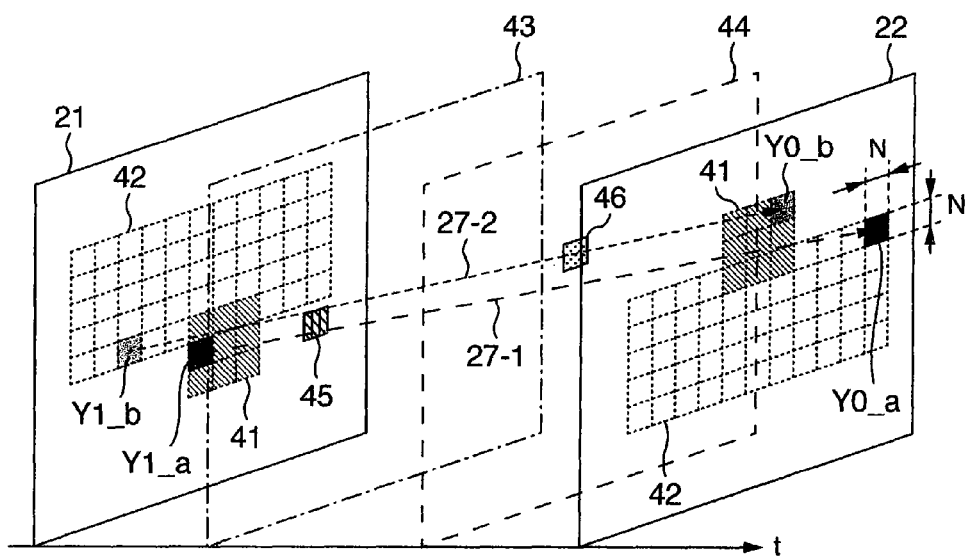
FIG. 4 is a diagram for indicating another example as to the interpolation frame production by the block matching method.

FIG. 3 indicates such a case that one sheet of an interpolation frame is inserted at an intermediate gravity position in a temporal manner between two original frames in an input picture signal, as explained in such a case that, for example, a frame rate is converted from 60 Hz to 120 Hz. In contrast thereto, as shown in FIG. 4, there is another case that a plurality of interpolation frames are inserted between key frames, as explained in such a case that a frame rate is converted from 24 Hz to 60 Hz such as a 2-to-3 pull down signal (more correctly speaking, in case that a signal where 2-to-3 pull down type frame rate is 60 Hz is converted into another signal where a non-pull down type frame rate is 60 Hz). A description is made of one example as to forming of interpolation frames in the above-described case with reference to FIG. 4.

In FIG. 4, both a first interpolation frame 43 and a second interpolation frame 44 are inserted between the present frame signal 21 and the preceding frame signal 22. In this example, it is so assumed that both the present frame signal 21 and the preceding frame signal 22 are original frames in a 2-to-3 pull down signal, and picture contents of these frame signals 21 and 22 are different from each other. That is to say, while the adjoining frames "A" and "A", or "B" and "B" within the frame stream AA, BBB, CC, - - - , of the above-explained 2-to-3 pull down signal are not employed as the first interpolation frame 43 and the second interpolation frame 44, when the first interpolation frame 43 is defined as "A", the second interpolation frame 44 is assumed as "B." Also, when the first interpolation frame 43 is defined as "B", the second interpolation frame 44 is assumed as "C."

With respect to the subject block 45 in the first interpolation frame 43, a first retrieving range 41 is set on the present frame signal 21, and a second retrieving range 42 is set on the preceding frame signal 22. As apparent from FIG. 4, the second retrieving range 42 is larger than the first retrieving range 41. This reason is given as follows: That is, a temporal distance from the present frame signal 21 up to the first interpolation frame 43 is shorter than a temporal distance from the preceding frame signal 22 up to the first interpolation frame 43. As a consequence, when the above-described difference value matching calculation is carried out from blocks on the present frame signal 21 and the preceding frame signal 22, which are located at positions of point symmetry, while a subject block 45 of the first interpolation frame 43 is set as a center, dimensions of settable retrieving ranges are different from each other. Similarly, as to a subject block 46, due to a difference in temporal distances (gravity positions) between the present frame signal 21 and the preceding frame signal 22, the retrieving range 42 is set on the present frame signal 21, whereas the retrieving range 41 whose dimension is different from that of the retrieving range 42 is set on the preceding frame signal 22.

Similar to the converting process operation for the above-described conversion (60 Hz to 120 Hz) shown in FIG. 3, with respect to each of the subject block 45 of the first interpolation frame 43 and the subject block 46 of the second interpolation frame 44, difference value matching calculations are carried out within the retrieving ranges 41 and 42 set on the present frame signal 21 and the preceding frame signal 22. As a consequence, similar to the above-described operation, a pair of blocks whose difference value is the smallest value are extracted, and a direction of such a straight line which connects these blocks is detected as motion vectors 27-1 and 27-2. In this example, since two pieces of the interpolation frames 43 and 44 are present, two pieces of the motion vectors required for producing the interpolation pixels are also present (reference numerals 27-1 and 27-2 shown in FIG. 4).

Similar to the above case, the motion vectors 27-1 and 27-2 obtained in the above-explained manner are inputted to the interpolation frame producing unit 25. The interpolation frame producing unit 25 calculates interpolation pixel values by employing these two motion vectors 27-1 and 27-2, while considering temporal gravity positions of the first interpolation frame 43 and the second interpolation frame 44 respectively. Concretely speaking, a pixel value (being defined as "I(1)") of the subject block 45 on the first interpolation frame 43, and another pixel value (being defined as "I(2)") of the subject block 46 on the second interpolation frame 44 are calculated in accordance with the below-mentioned expression 1 and expression 2 based upon weighted adding calculations by considering gravity positions along the temporal direction:

$$I(1) = (3*Y1\_a + 2*Y0\_a)/5 \quad \text{(expression 1)}$$

$$I(2) = (Y1\_b + 4*Y0\_b)/5 \quad \text{(expression 2)}$$

In these expressions, symbol "Y1_a" indicates the pixel value of the present frame signal 21 indicated by the motion vector 27-1; symbol "Y0_a" represents the pixel value of the preceding frame signal 22 denoted by the motion vector 27-1; symbol "Y1_b" shows the pixel value of the present frame signal 21 indicated by the motion vector 27-2; and also, symbol "Y0_b" represents the pixel value of the preceding frame signal 22 denoted by the motion vector 27-2.

In this example, the reason why "3" is multiplied as a coefficient by the pixel Y1_a in the expression 1 and "2" is multiplied as a coefficient by the pixel Y0_a in this expression 1 is given as follows: That is, a ratio of a temporal distance between the first interpolation frame 43 and the present frame signal 21 to a temporal distance between the first interpolation frame 43 and the preceding frame signal 22 is 2:3. Similarly, the reason why "1" is multiplied as a coefficient by the pixel Y1_b in the expression 2 and "4" is multiplied as a coefficient by the pixel Y0_b in this expression 2 is given as follows: That is, a ratio of a temporal distance between the second interpolation frame 44 and the present frame signal 21 to a temporal distance between the second interpolation frame 44 and the preceding frame signal 22 is 4:1.

Figure 5:
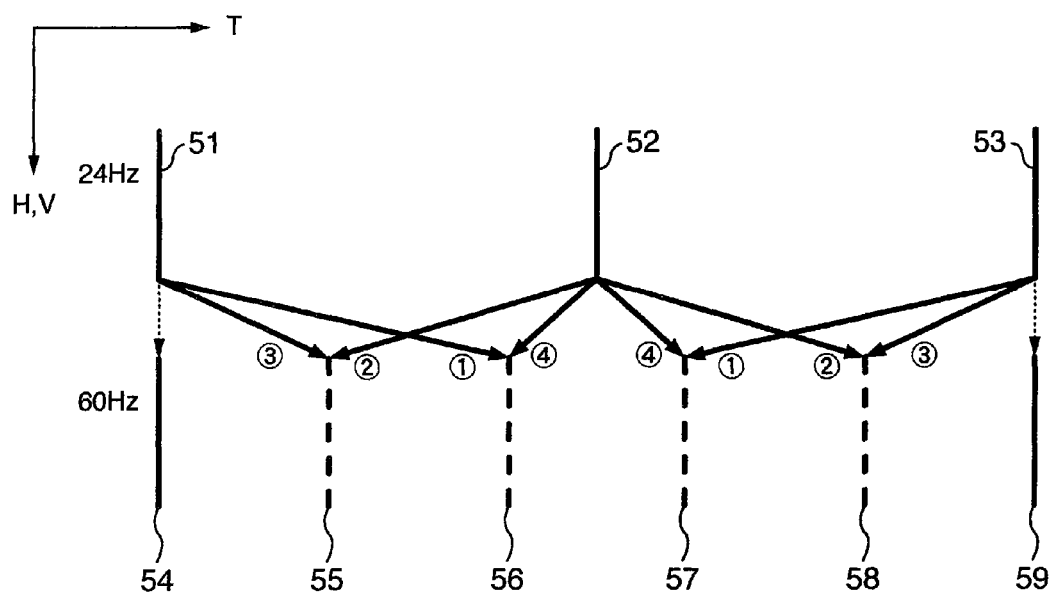
FIG. 5 is an explanatory diagram for explaining a weighted adding calculation of a time direction performed in the FRC 3.

FIG. 5 represents an example as to the above-described weighted adding calculation along the temporal direction, namely shows such an example that frames 51 to 53 of 24 Hz are converted into frames 54 to 59 of 60 Hz. It should be understood that reference numerals of circular marks indicate weighted values (coefficients) when interpolation frames are produced. As shown in FIG. 5, a pixel value of the frame 51 is multiplied by a coefficient "3", the frame 52 is multiplied by a coefficient "2", and either the expression 1 or the expression 2 is calculated so as to obtain the frame 55. Similarly, when the frame 56 is obtained, a pixel value of the frame 51 is multiplied by a coefficient "1", and the frame 52 is multiplied by a coefficient "4"; when the frame 57 is obtained, a pixel value of the frame 52 is multiplied by a coefficient "4", and the frame 53 is multiplied by a coefficient "1"; when the frame 58 is obtained, a pixel value of the frame 52 is multiplied by a coefficient "2", and the frame 53 is multiplied by a coefficient "3." It should also be noted that the frames 54 and 59 have the same picture contents as those of the frames 51 and 53, respectively, and the respective frames 51 and 53 are directly copied to be produced.

Since the interpolation frame producing unit 25 performs the above-described calculations, the interpolation frame producing unit 25 produces such interpolation frames in the case that a plurality of interpolation frames are inserted between two original frames.

In a memory interface unit 26, data as to interpolation frames produced from the interpolation frame producing unit 25 is written in the image memory 4. Also, in the memory interface unit 26, both the previously stored original frame signal and the above-described written interpolation frame are read out at timing in response to the FRC converting mode signal 9 so as to combine the original frame with the interpolation frame. For instance, when the FRC converting mode signal 9 indicates such a mode that the frame rate is converted from 60 Hz to 120 Hz, the memory interface unit 26 alternately reads an original frame signal and an interpolation film in a time period of 1/120 seconds in order to insert the interpolation frame between the two original frames. As a result, the memory interface unit 26 produces a new frame stream 29 containing the interpolation frame and then outputs the produced new frame stream 29, when the FRC converting mode signal 9 indicates such a mode that the frame rate is converted form 24 Hz to 60 Hz, as shown in FIG. 5, the memory interface unit 26 reads these frames 54 to 59 in a time period of 1/60 seconds in order that 4 pieces of the frames 55 to 58 are inserted between the frame 54 (original frame 51) and the frame 59 (original frame 53). At this time, the original frame 52 is deleted. As a consequence, the above-described process operation is designed to replace the original frame 52 by the interpolation frames 55 to 58. Concretely speaking, such a frame having the same content as the content of either the original frame 51 or the original frame 52, which is located between the original frames 51 and 52, and further, such a frame having the same content as the content of either the original frame 52 or the original frame 53, which is located between the original frames 52 and 53, are replaced by the interpolation frames 55 to 58 in combination with the original frame 52.

In this case, a description is made of new knowledge which could be obtained by that the Inventors of the present invention could evaluate image qualities as to the frame rate converting operations.

As to such a frame rate conversion that a frame rate is multiplied by an integer, for instance, is converted from 60 Hz to 120 Hz, or 30 Hz to 60 Hz, in such a case that only one interpolation frame is inserted between original frames, even when an image quality of the above-described interpolation frame to be inserted is slightly deteriorated by erroneously detecting a motion vector, the appearance of this slight deterioration is not substantially recognized by human eyes. As a result, a visual effect (namely, improvement in smoothness of moving picture) which is caused by improving temporal resolution may become larger. To the contrary, with respect to such a frame rate conversion that a frame rate is multiplied by a non-integer, for instance, is converted from 24 Hz to 60 Hz, or 50 Hz to 60 Hz, in such a case that a plurality of interpolation frames are inserted between original frames, when image qualities of the above-described plural interpolation frames to be inserted are deteriorated due to erroneous detections of motion vectors 2, or more sheets of the deteriorated images are continued in a temporal manner. As a result, such deteriorated images may be recognized even by human eyes, so that the deterioration of the image qualities become conspicuously rather than the effect of the temporal resolution improvement. In other words, when 2, or more sheets of the deteriorated images are continued in the temporal manner, the human eyes may recognize this image deterioration.

Figure 6:
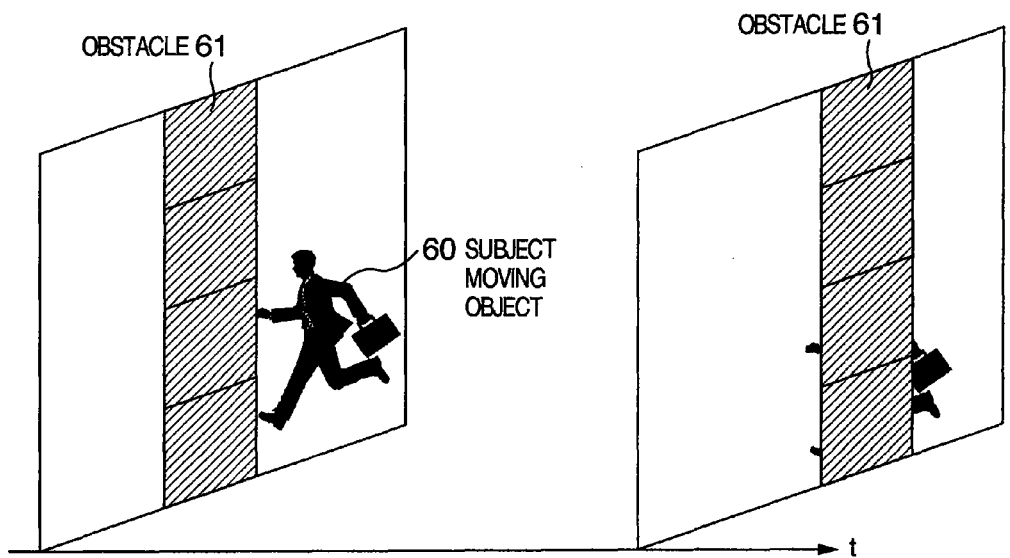
FIG. 6 is a diagram for showing an example of an image pattern by which a motion vector is erroneously detected.

Next, a description is made of the above-explained deteriorated image caused by erroneously detecting the motion vector. As previously described, when a motion vector is detected, a correlative relationship among frames from a present frame picture and a preceding frame picture is basically acquired by executing a difference value matching calculation in a block unit and a pixel unit, and then, a pixel value of an interpolation frame is calculated from such a pixel value at a position where the correlativity is the highest value. However, for instance, as shown in FIG. 6, in such an image that a subject moving object 60 passes through a rear side of an obstacle 61 among frames, a portion of the subject moving object 60 is not present in the picture for several frames. In such a case, correct motion vectors as to the subject moving object 60 cannot be calculated.

Also, normally, when a motion vector is detected, in order to improve reliability of this motion vector detection, there are many possibilities that a motion vector of a certain pixel is corrected with reference to motion vectors as to pixels located around the certain pixel, and also motion vectors of the entire screen. As a result, in such a picture that the entire screen is panned along a constant direction, motion vectors having considerably higher precision can be obtained. However, in such a picture case that a plurality of different motion are present in a screen, correct motion vector detections rapidly become difficult. Moreover, also, in such a case that there is quick motion between 2 frames, which exceeds the retrieving ranges 35, 41, and 42 of such move vectors as indicated in FIG. 3 and FIG. 4, the motion vectors cannot be correctly detected, so that collapse of an image may be conducted. As the most simple resolution of this image collapse, it is conceivable that a motion vector retrieving range is expanded. However, as a result of this expansion of the motion vector retrieving range, possibilities of erroneously detecting the motion vectors are increased, and also, there are some possibilities that calculation amounts are increased, and a circuit scale is increased when a motion vector detecting circuit is realized by employing hardware.

Under such a circumstance, in this first embodiment, the above-described problem may be solved by switching an interpolating method, namely, a method for forming an interpolation frame in response to either a format of an input picture signal or a mode of a frame rate conversion. In other words, the interpolating method is changed based upon such a condition for indicating whether the mode of the frame rate conversion is the integer multiplying conversion (for instance, 60 Hz is converted into 120 Hz), or the non-integer multiplying conversion (for example, 50 Hz is converted into 60 Hz). In the latter conversion case, the below-mentioned process operation is also contained. That is, while an interpolation frame is replaced by an original frame, a frame rate is not changed such as, for example, a 2-to-3 pull down type signal is converted into a non-pull down type signal having a frequency of 60 Hz.

Figure 7:
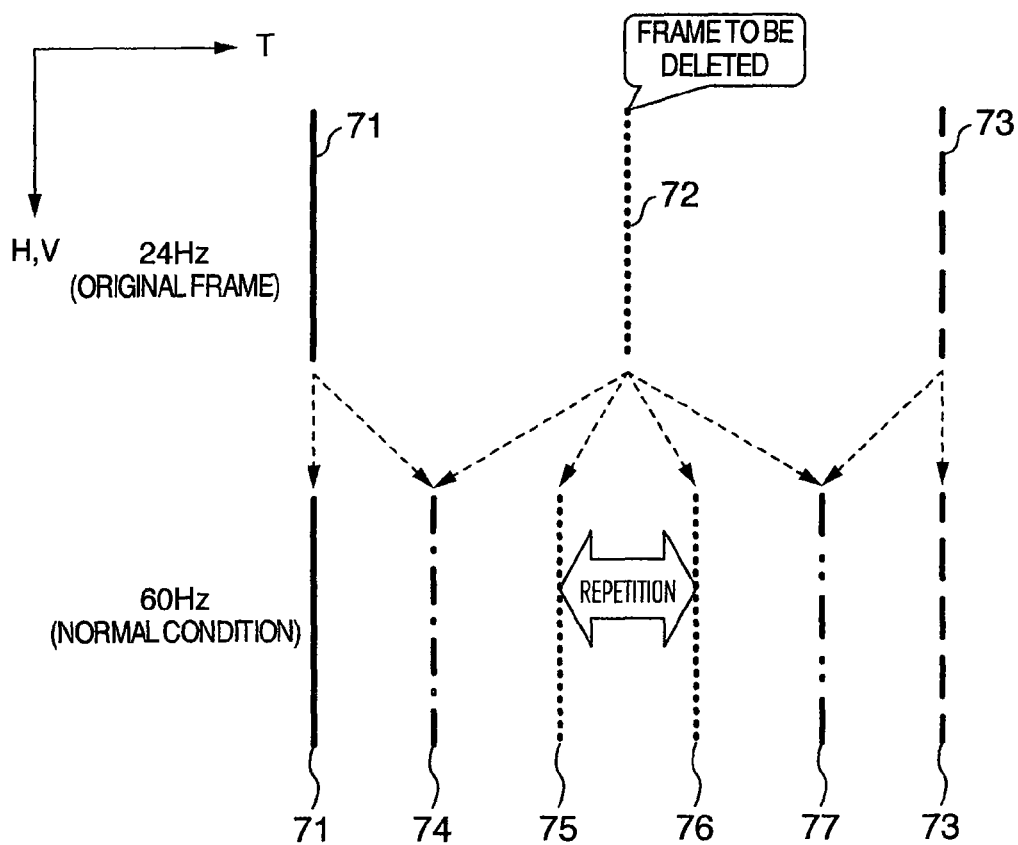
FIG. 7 is a diagram for indicating an example of a frame slide system corresponding to one of interpolation systems.

FIG. 7 is a diagram for representing a conceptional idea of changing the interpolating method according to the first embodiment. As previously explained, when a motion vector is erroneously detected, in such a conversion mode that 4 sheets of interpolation frames are continued, collapse of an image may be easily recognized by human eyes. As a consequence, as shown in FIG. 7, an original frame 72 which is normally deleted is directly produced as interpolation frames 75 and 76, and then, these produced interpolation frames 75 and 76 are used. As to interpolation frames 74 and 77, these interpolation frames 74 and 77 are normally produced based upon such a method as shown in FIG. 4. In other words, in such a case that a frame rate is changed from 24 Hz to 60 Hz, the original frame 72 which has been deleted in order to arrange a frame stream after a conversion in a temporal equi-interval is directly slid to the interpolation frame position and is employed. The above-described interpolation frames 75 and 76 are produced by copying the original frame 72, and are produced without using a motion vector. In other words, these interpolation frames 75 and 76 have the same picture contents as that of the original frame 72.

As a consequence, an interpolation frame between the original frames 71 and 72 may be arranged as such a frame structure that 2 sheets, or more sheets of interpolation frames produced by employing a motion vector are not continued. Accordingly, the recognition as to the collapse of the image can be reduced which occurs by employing the motion vector. In this example, this interpolating method will be referred to as a frame slide system. Apparently, in accordance with this frame slide system, the smoothness of the moving picture corresponding to the original effect achieved by the frame rate conversion is reduced, as compared with such a case that a perfect interpolation frame is produced. However, in the present-staged vector detecting technique performed by employing the realistic calculation around and the actual hardware structure, it is practically difficult to produce perfect interpolation frames with respect to any sorts of images. As a consequence, the following idea may be eventually accepted as a desirable idea. That is, although the above-explained moving picture improving effect is slightly reduced, such a frame conversion that collapse of a picture is not recognized is preferable, as compared with another frame conversion that the picture collapse is recognizable.

It should also be understood that in the example of FIG. 7, since the original frame 72 to be deleted has been repeated two times, both the interpolation frames 75 and 76 have been produced, but the present invention is not limited thereto. Alternatively, for instance, since the frame 71 is repeated two times, both the interpolation frames 71 and 74 may be produced. Otherwise, since the frame 73 is repeated two times, both the interpolation frames 73 and 77 may be produced. At this time, the interpolation frame 75 may be produced from the original frames 71 and 72 by employing the motion vector, whereas the interpolation frame 76 may be produced from the original frames 72 and 73 by employing the motion vector.

Also, in the example shown in FIG. 7, both the interpolation frames 75 and 76 are produced by coping the original frame 72 to be deleted. Alternatively, any one of these interpolation frames 75 and 76 may be produced by coping the original frame 72 to be deleted. In this alternative case, the other interpolation frame may be produced from the original frames 72 and 71, or 73 by employing the motion vector in a similar manner to the above-described method.

Figure 8:
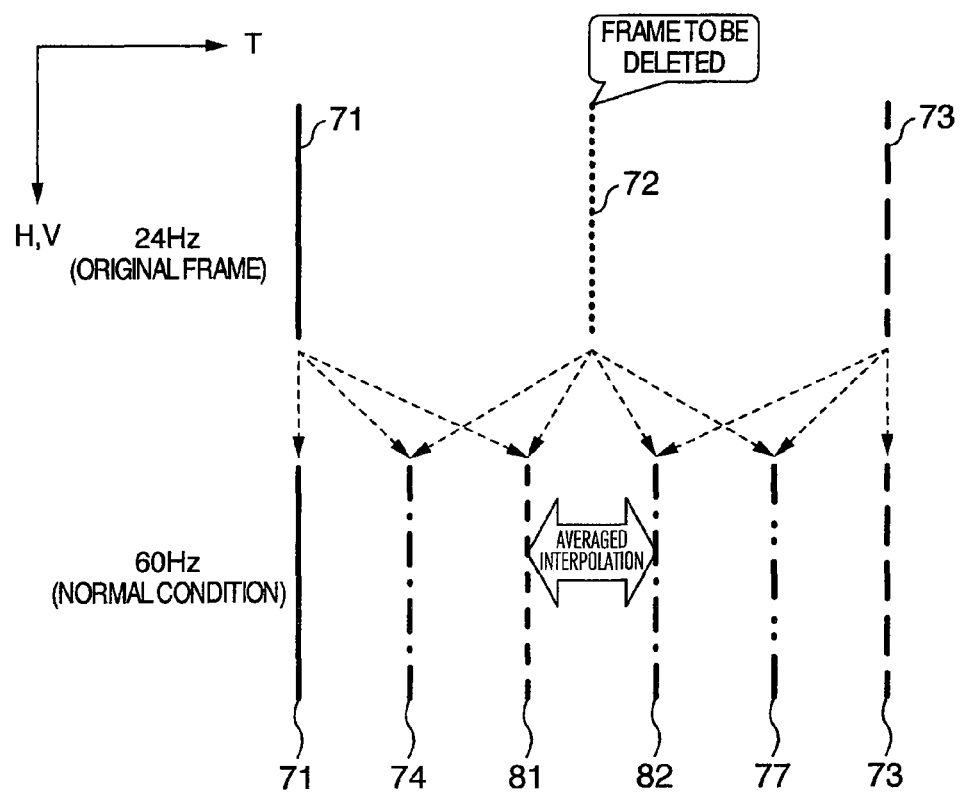
FIG. 8 is a diagram for indicating an example of a linear interpolation system corresponding to one of the interpolation systems.

FIG. 8 indicates another interpolation method which is different from the interpolation method of FIG. 7. In FIG. 8, the same reference numerals shown in FIG. 7 will be employed as those for denoting the same structural elements indicated in FIG. 8, and descriptions thereof will be omitted.

In FIG. 8, the original frame 72 is not directly slit to the interpolation frame position as shown in FIG. 7, but an interpolation frame 81 is produced by processing the original frames 71 and 72 in a linear interpolation manner. That is to say, the interpolation frame 81 is produced based upon an averaged value of the original frames 71 and 72. Similarly, an interpolation frame 82 is produced by processing the original frames 73 and 72 in a linear interpolation manner. That is to say, the interpolation frame 82 is produced based upon an averaged value of the original frames 73 and 72. In this case, as shown in FIG. 5, a weighted adding calculation is carried out by considering a gravity position of a temporal direction. This interpolating method will be referred to as a "linear interpolation system."

Also, in the example of FIG. 8, although the interpolation frames 81 and 82 have been produced by performing the averaged interpolation, the present invention is not limited thereto. Alternatively, the interpolation frames 74 and 77 may be produced by performing the averaged interpolation. At this time, the interpolation frame 81 may be produced from the original frames 71 and 72 by employing the motion vector, and the interpolation frame 77 may be produced from the original frames 72 and 73 by employing the motion vector. Also, in the example of FIG. 8, both the interpolation frames 75 and 76 have been produced by executing the average interpolation. Alternatively, any one of these interpolation frames 75 and 76 may be produced by performing the average interpolation. In this alternative case, the other interpolation frame may be produced from the original frames 72 and 71, or 73 by employing the motion vector in a similar manner to the above-described manner.

It should also be understood that in the above-described examples shown in FIG. 7 and FIG. 8, the interpolation by the frame slide system and the interpolation by the linear interpolation system have been applied to the two positions of the interpolation frame positions. The present invention is not limited only to the above interpolations. Alternatively, these interpolations based upon the frame slide system and the linear interpolation system may be applied to 3 portions.

Figure 9:
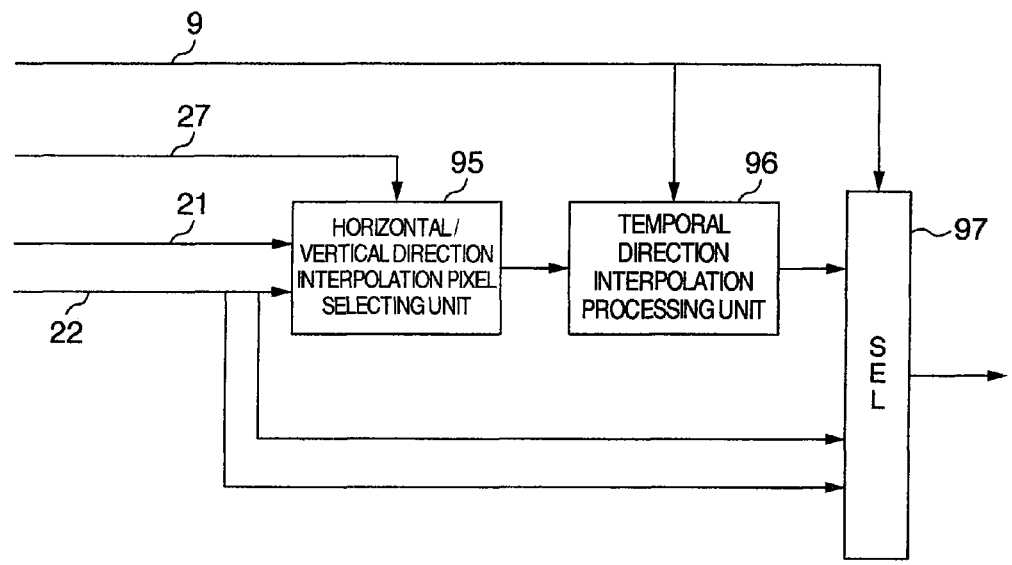
FIG. 9 is a diagram for showing one structural example of an interpolation frame producing unit employed in the first embodiment.
Figure 10:
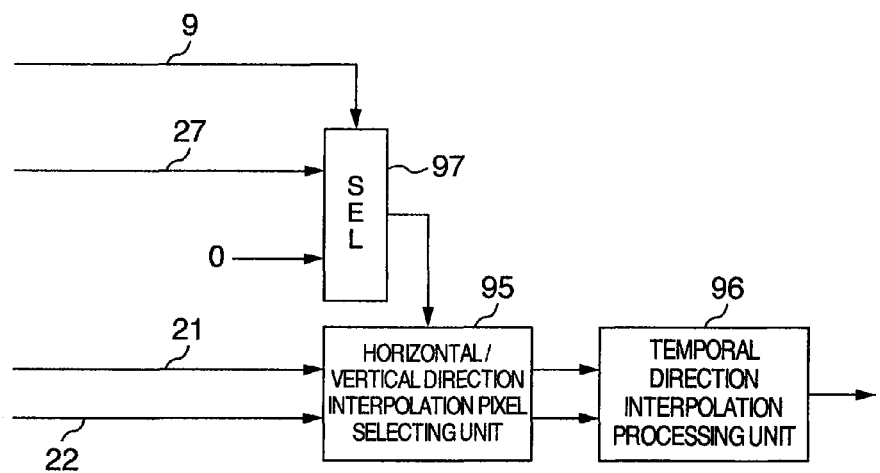
FIG. 10 is a diagram for indicating another structural example of the interpolation frame producing unit employed in the first embodiment.

FIG. 9 and FIG. 10 show one structural example as to the interpolation frame producing unit 25 for performing the interpolation systems represented in FIG. 7 and FIG. 8.

In FIG. 9, the present frame signal 21 and the preceding frame signal 22 are entered to a horizontal/vertical direction interpolation pixel selecting unit 95 and an FRC output selector unit 97. The horizontal/vertical direction interpolation pixel selecting unit 95 selects subject pixels on the present frame signal 21 and the preceding frame signal 22, which are designated by the motion vector 27. In this case, it is so assumed that the motion vector 27 is detected by a similar method to that as explained in FIG. 3, or FIG. 4. A temporal direction interpolation processing unit 96 calculates an interpolation pixel by performing a weighted adding calculation in response to the FRC converting mode signal 9 by employing the selected subject pixels along the horizontal/vertical directions. In such a case that the FRC converting mode signal 9 indicates, for example, the conversion mode from 24 Hz to 60 Hz, the temporal direction interpolation processing unit 96 executes such a calculating operation as indicated in FIG. 5.

The selector unit 97 performs a switching operation to the frame slide system in response to the FRC converting mode signal 9. That is, in such a case that the FRC converting mode signal 9 indicates, for example, such a conversion mode from 24 Hz to 60 Hz, as represented in FIG. 7, the selector unit 97 performs a control operation for repeating a key frame at the temporal gravity positions of the interpolation frames 75 and 76. In other words, when the FRC converting mode signal 9 shows the above-described conversion mode, the selector unit 97 selects either the present frame signal 21 or the preceding frame signal 22 so as to output the selected frame signal 21, or 22 instead of the output from the temporal direction interpolation processing unit 96.

It should also be noted that although the above-described arrangement of the interpolation frame producing unit 25 forcibly performs the frame slide system in the FRC conversion mode, the present invention is not limited only thereto. For example, the interpolation frame producing unit 25 may be alternatively arranged by providing such a mode that the frame slide system is not utilized in response to the FRC conversion mode. Also, output switching of the FRC 3 may not be carried out by the interpolation frame producing unit 25, but may be alternatively carried out by the data reading control operation by the memory interface unit 25.

FIG. 10 shows another structural example as to the linear interpolation system. It should also be noted that the same reference numerals shown in FIG. 9 will be employed for denoting the same structural elements as those shown in FIG. 10, and explanations thereof will be omitted. In FIG. 10, the motion vector 27 detected by the motion vector detecting unit 23, and a vector "0" have been inputted to the selector unit 97. In this example, the above described vector "0" represents that a vector has no motion. In response to the FRC converting mode signal 9, the selector unit 97 switches the motion vector 27 detected by the motion vector detecting unit 23, or the vector "0." That is to say, for example, in such a case that the FRC converting mode signal 9 indicates the conversion mode from 24 Hz to 60 Hz, as indicated in FIG. 8, the motion vector becomes "0" at the temporal gravity positions of the interpolation frames 75 and 76. As a result, the linear interpolation is carried out in this manner.

In this example, although such a vector which has no motion is expressed by "0", the present invention is not limited only thereto. If an interpolation frame producing unit may perform the linear interpolation, then any type of interpolation frame producing units may be alternatively employed. As previously described, in the first embodiment, the image processing apparatus can execute the optimum frame conversion having a small number of image collapse in response to a format of an input picture signal, or a conversion mode of FRC, so that the optimum image can be obtained.

Second Embodiment

Figures 11, 12:
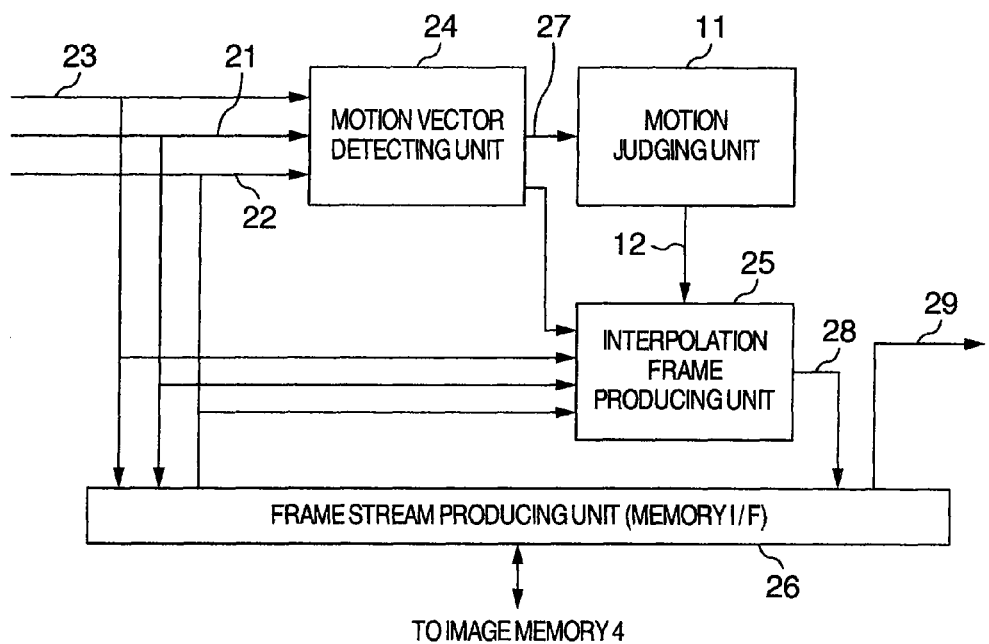
FIG. 11 is a block diagram for representing an arrangement of an image processing apparatus according to a second embodiment of the present invention.
FIG. 12 is a diagram for indicating one example of a histogram detecting result.

Next, a description is made of a second embodiment according to the present invention with reference to FIG. 11 to FIG. 17. FIG. 11 shows one structural example of a frame rate converting unit according to the second embodiment. It should be understood that the same reference numerals shown in FIG. 2 will be employed for denoting the same structural element indicated in FIG. 11, and descriptions thereof will be omitted. The frame rate converting unit of this second embodiment is featured by that switching of interpolating methods is carried out in response to a feature of a detected motion vector. A detailed description of this switching operation will be made by mainly explaining a different portion from the above-explained first embodiment.

In the structural example of FIG. 11, a motion judging unit 11 is furthermore provided in the structural example shown in FIG. 2, while the motion judging unit 11 produces a motion judging signal 12 from a motion vector 27 so as to control an interpolation frame producing unit 25. The motion judging unit 11 detects a feature as to motion of a subject frame based upon the motion vector 27 so as to output the motion judging signal 12. The feature of this motion is detected by, for example, a histogram of a motion vector contained in one screen. FIG. 12 represents an example as to a detection result of motion histograms. In a table of FIG. 12, a column direction corresponds to 5 blocks long a vertical direction of a vector detecting range in a motion vector detecting unit 24, whereas a row direction corresponds to 11 blocks along a horizontal direction of the vector detecting range.

Figure 13:
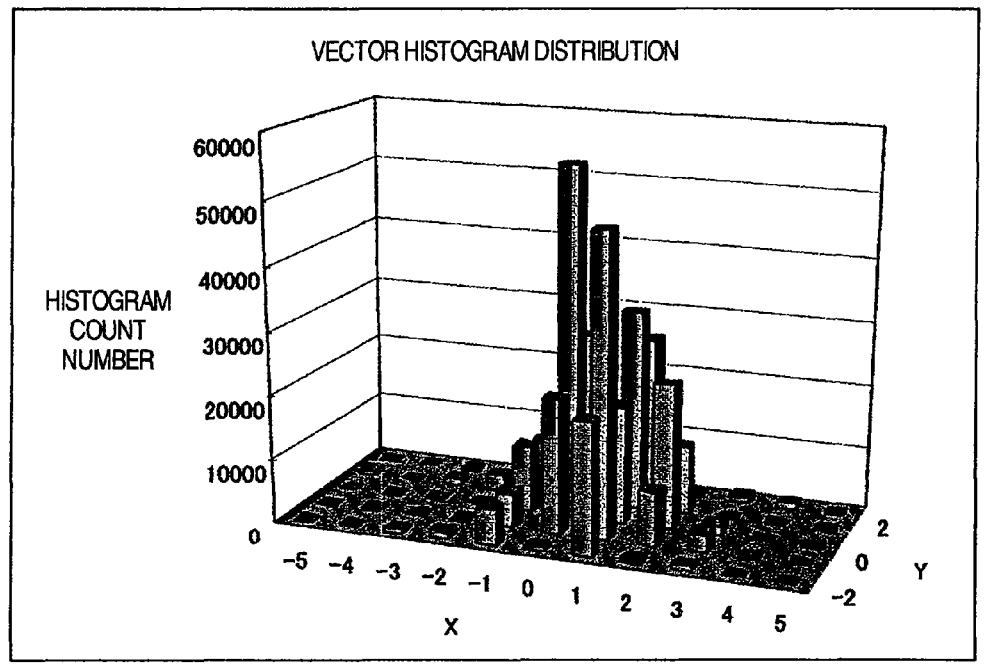
FIG. 13 is a diagram for showing an example as to a vector histogram distribution.

FIG. 13 graphically represents the table of FIG. 12. An X axis of the graph of FIG. 13 corresponds to the horizontal direction of the vector detecting range, whereas a Y axis thereof corresponds to the vertical direction of the vector detecting range. Also, a Z axis of the graph indicates an appearing frequency of motion vectors. In the example of FIG. 13, the following fact may be revealed: That is, a large number of motion vectors are concentrated in the vicinity of a vector (0, 0), and thus, there is substantially no motion. In the second embodiment, the above-described histogram will be referred to as a vector histogram distribution. The motion judging unit 11 judges a feature of motion by employing the vector histogram distribution. The frame rate converting unit switches the frame slide system, or the linear interpolation system in response to the judged feature of this motion.

Figure 14:
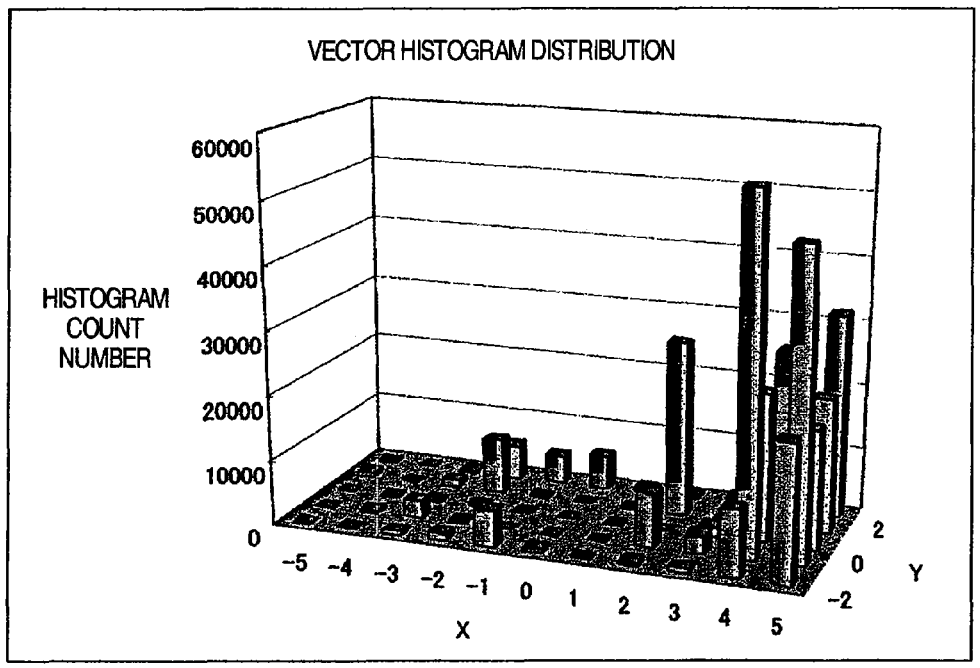
FIG. 14 is a diagram for indicating another example as to the vector histogram distribution.
Figure 15:
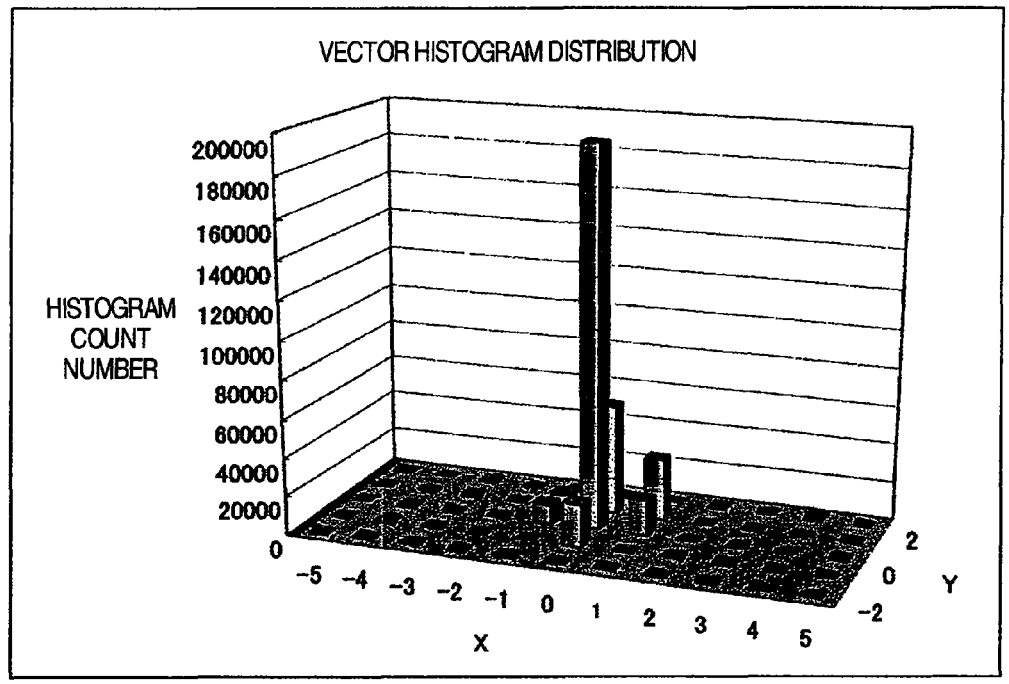
FIG. 15 is a diagram for showing another example as to the vector histogram distribution.

For example, as indicated in FIG. 14, in such a case that a vector histogram distribution is concentrated at a boundary portion of the retrieving range, which is larger than, or equal to a predetermined threshold value, the motion judging unit 11 judges that there are large numbers of quick motion objects which exceed the retrieving range in this screen. As another judging method, when motion exceeds the retrieving range, the motion judging unit 11 may utilize that such patterns (namely, patterns of straight lines while interpolation pixel located in interpolation frame is defined as center) which can be correctly matched with each other (namely, differences between present frames and preceding frames) are not present. In other words, when matching cannot be correctly established, there are some cases that a plurality of blocks having the same matching values are present which in the retrieving range. In these cases, when the matching values are equal to each other, in such a case that such an algorithm for counting either the vector (0, 0) or vectors close to the first-mentioned vector at a top priority is employed, as represented in FIG. 15, it is conceivable that a distribution is concentrated to the vector (0, 0). In this case, when the distribution is concentrated to the vector (0, 0), which is larger than, or equal to the predetermined threshold value, the motion judging unit 11 judges that such a motion which exceeds the retrieving range is present. It should also be noted that the condition for indicating whether or not the distribution is concentrated to the vector (0, 0) may depend upon the algorithm for detecting the motion vector, but the present invention is not limited thereto.

Figure 16:
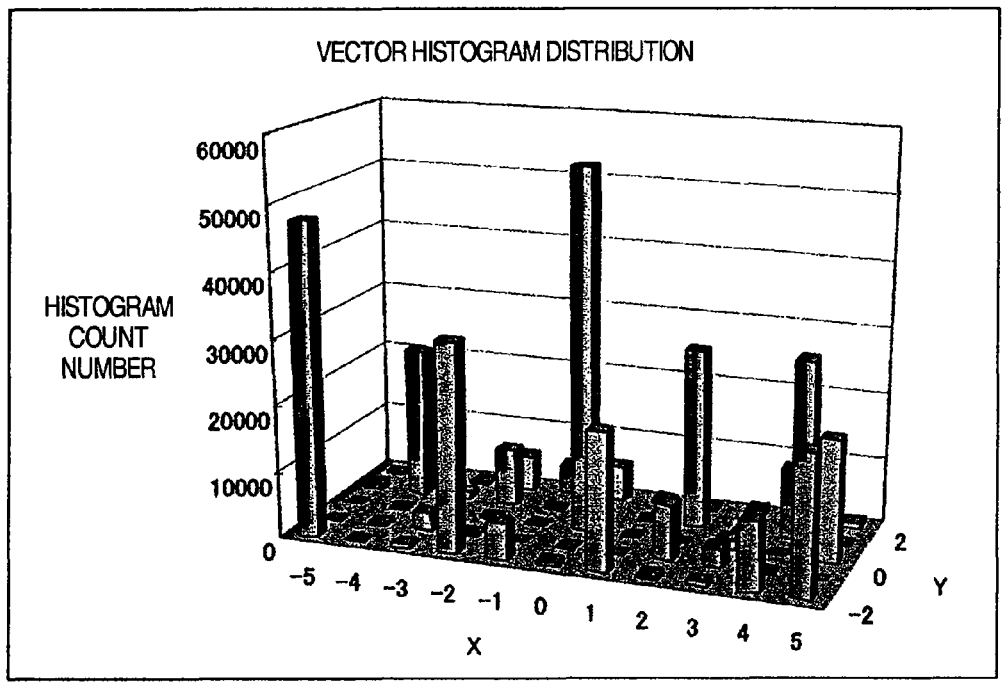
FIG. 16 is a diagram for indicating another example as to the vector histogram distribution.

Also, as represented in FIG. 16, in the case that a distribution larger than, or equal to the predetermined threshold value is scattered the motion judging unit 11 judges that this distribution is an image where a plurality of motion is present.

When pictures having such vector histogram distributions as shown in FIG. 14 to FIG. 16 are inputted to the motion judging unit 11, the motion judging unit 11 outputs a motion judging signal 12 indicative of the pictures. The motion judging signal 12 may be realized by, for example, a 1-bit signal indicative of either 1 or 0. In other words, when such picture patterns having the vector histogram distributions as indicated in FIG. 14 to FIG. 16 are inputted from which vector erroneous detections may be estimated, the motion judging unit 11 outputs the motion judging signal 12 of "1", whereas when the above-described picture patterns are not inputted, the motion judging unit 11 outputs the motion judging signal 12 of "0." Then, when the motion judging signal 12 is "1", the interpolation frame forming unit 25 forms an interpolation frame without employing such a motion vector as the above-described frame slide system, or linear interpolation system. On the other hand, when the motion judging signal 12 is "0", the motion judging unit 11 forms an interpolation frame by employing such motion vectors as represented in FIG. 3 and FIG. 4.

Figure 17:
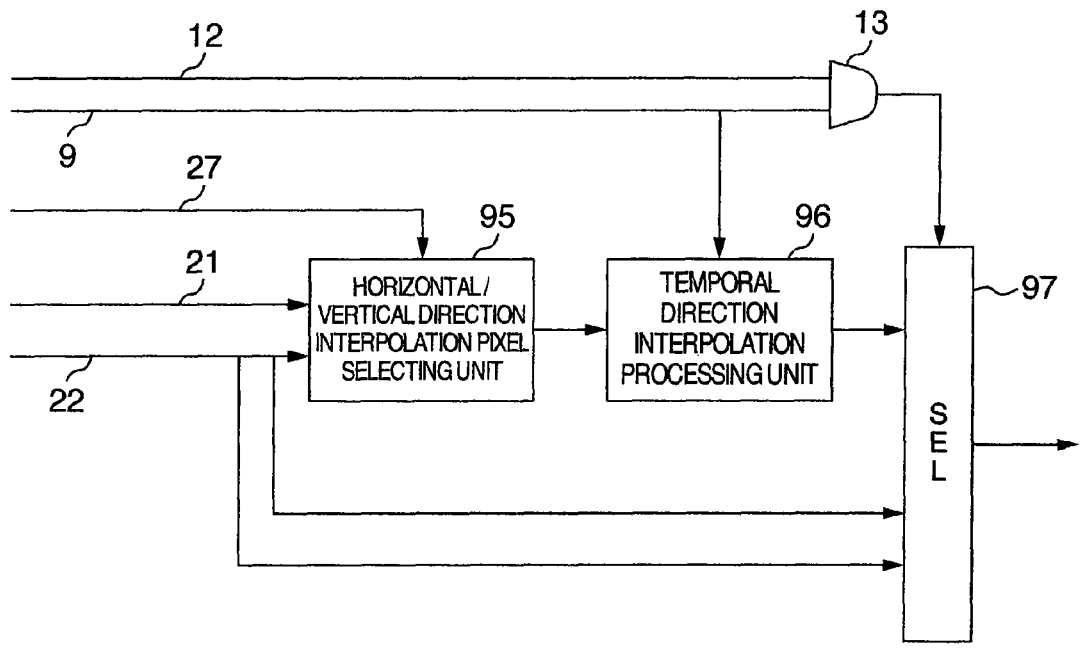
FIG. 17 is a diagram for indicating one structural example of an interpolation frame producing unit employed in the second embodiment.

FIG. 17 is a block diagram for indicating one structural example of an interpolation frame producing unit 25 according to the second embodiment. It should be understood that the same reference numerals shown in FIG. 9 will be employed for denoting the same structural element indicated in FIG. 17, and descriptions thereof will be omitted. To the selector unit 97, the original frame data 21 and 22, and interpolation frame data are inputted, which has been produced by employing the motion vector 27 detected in the motion vector detecting unit 24. On the other hand, both the FRC converting mode signal 9 and the motion judging signal 12 are inputted to an AND gating unit 13. Then, in such a case that the FRC converting mode signal 9 indicates, for instance, the conversion mode from 24 Hz to 60 Hz, and furthermore, the motion judging signal 12 is "1", the AND gating unit 13 outputs "1" to the selector unit 97, whereas the AND gating unit 13 outputs "0" to the selector unit 97 in other cases. When the signal from the AND gating unit 13 is "1", the selector unit 97 selects the original frame data 21 and 22 so as to execute the frame slide system. When the signal from the AND gating circuit 13 is "0", the selector unit 97 selects the temporal direction interpolation processing unit 96.

In the case that the linear interpolation system is utilized, as a control signal to the selector unit 97 of FIG. 10, the signal derived from the above-described AND gating unit 13 may be employed. In other words, when the signal derived from the AND gating unit 13 is "1" under the above-described condition, the linear interpolation system is carried out, whereas when the signal derived from the AND gating unit 13 is "0", the interpolation frame is formed by employing the motion vector.

As previously described, in this second embodiment, the interpolating method can be switched in response to the feature of the motion of the inputted image, so that the frame rate converting operation having the less picture collapse can be realized.

Third Embodiment

Figure 18:
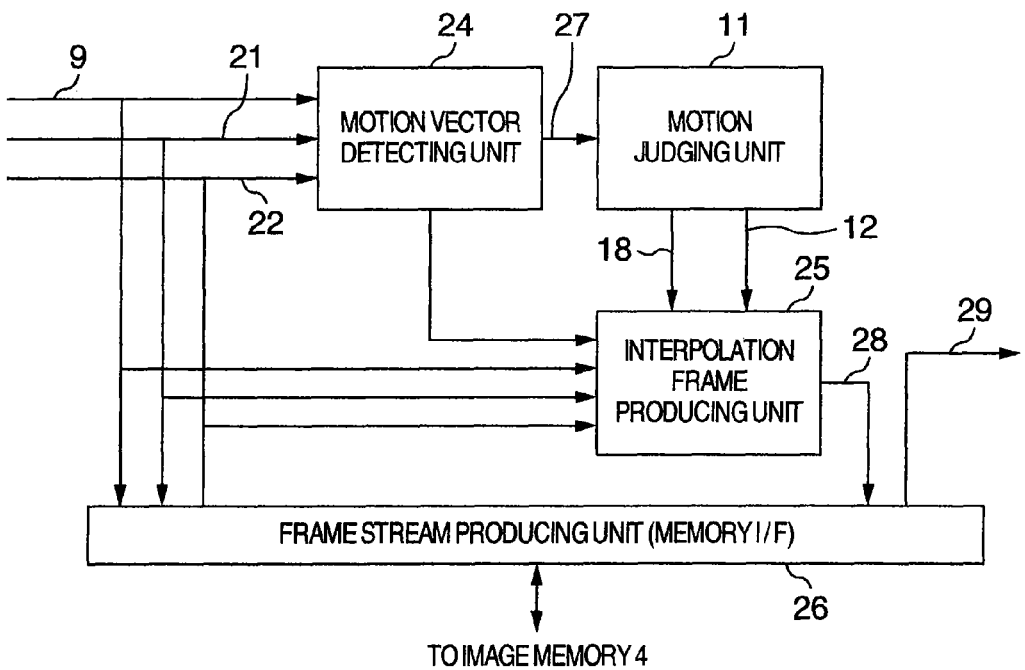
FIG. 18 is a block diagram for showing an arrangement of an image processing apparatus according to a third embodiment of the present invention.

FIG. 18 shows a third embodiment of the present invention. It should be noted that the same reference numerals indicated in other drawings will be employed as those for denoting the same structural elements shown in FIG. 18, and descriptions thereof will be omitted.

Figure 19:
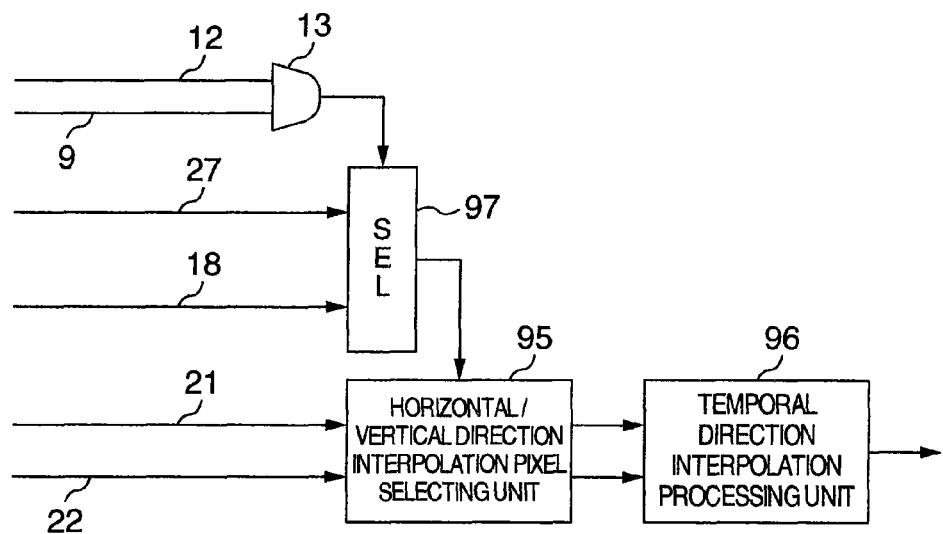
FIG. 19 is a diagram for indicating one structural example of an interpolation frame producing unit employed in the third embodiment.

The third embodiment is featured by that in response to an FRC conversion mode, rough motion (global vector) of an overall inputted image is detected, and then, an interpolating method is switched in response to this detected global vector. As a result, while a moving picture improving effect may be kept better, collapse of images may be reduced. Referring now to FIG. 18 and FIG. 19, a detailed description of the featured process operation will be made by mainly explaining different portions from those of the above-described first embodiment.

As previously explained in the second embodiment, the motion judging unit 11 detects a histogram of a motion vector. Moreover, the motion judging unit 19 outputs such vectors whose converted number is larger than, or equal to a predetermined threshold value from this detected histogram as a global vector 18 to the interpolation frame producing unit 25 in combination with the above-described motion judging signal 12. For example, in such a case that a histogram detected result is given as shown in FIG. 12, if the predetermined threshold value is assumed as 30,000, then the global vector 18 becomes (0, 0). As previously described in the second embodiment, depending upon the detection algorithm of the motion vector, with respect to such motion which exceeds the retrieving range, it is so conceivable that the distribution is concentrated to the vector (0, 0). In this case, while 2 pieces, or more pieces of predetermined threshold values are provided, when a counted value is larger than, or equal to a first threshold value, and furthermore, is smaller than, or equal to a second threshold value, the relevant vector may be alternatively sets as the global vector 18.

FIG. 19 is a block diagram for indicating one structural example of an interpolation frame producing unit 25 according to the third embodiment. It should be understood that the same reference numerals shown in other drawings will be employed for denoting the same structural element indicated in FIG. 19, and descriptions thereof will be omitted. To the selector unit 97, both the motion vector 27 detected in the motion vector detecting unit 24, and the global vector 18 outputted from the motion judging unit 11 are inputted. On the other hand, similar to the example of FIG. 17, the FRC converting mode signal 9 and the motion judging signal 12 derived from the motion judging unit 19 are inputted to an AND gating unit 13. Then, in such a case that the FRC converting mode signal 9 indicates, for instance, the conversion mode from 24 Hz to 60 Hz, and furthermore, the motion judging signal 12 is "1", the AND gating unit 13 outputs "1" to the selector unit 97, whereas the AND gating unit 13 outputs "0" to the selector unit 97 in other cases. When the signal from the AND gating unit 13 is "1", the selector unit 97 selects the global vector 18 as the motion vector. When the signal from the AND gating circuit 13 is "0", the selector unit 97 selects the motion vector 27.

A horizontal/vertical direction interpolation pixel selecting unit 95 selects pixels contained in the present frame signal 21 and the preceding frame signal 22, which are indicated by the global vector 18, with respect to all of interpolation pixels contained in the interpolation frame. A temporal direction interpolation processing unit 96 calculates an interpolation pixel by employing the pixels along the horizontal/vertical directions, which are represented by the global vector 18, in accordance with a weighted adding calculation in response to an FRC conversion mode. In other words, in this third embodiment, the temporal direction interpolation processing unit 96 performs the interpolation calculation by employing all of the motion vectors (global vector) of the same direction with respect to such an interpolation frame that a motion judging signal is "1."

As previously described, in the third embodiment, the moving picture improving effect achieved by the FRC can be maximized with respect to, in particular, such a picture that the entire screen has been panned along a constant direction. Moreover, the picture collapse caused by mistakenly detecting the vector can be reduced.

Fourth Embodiment

Figure 20:
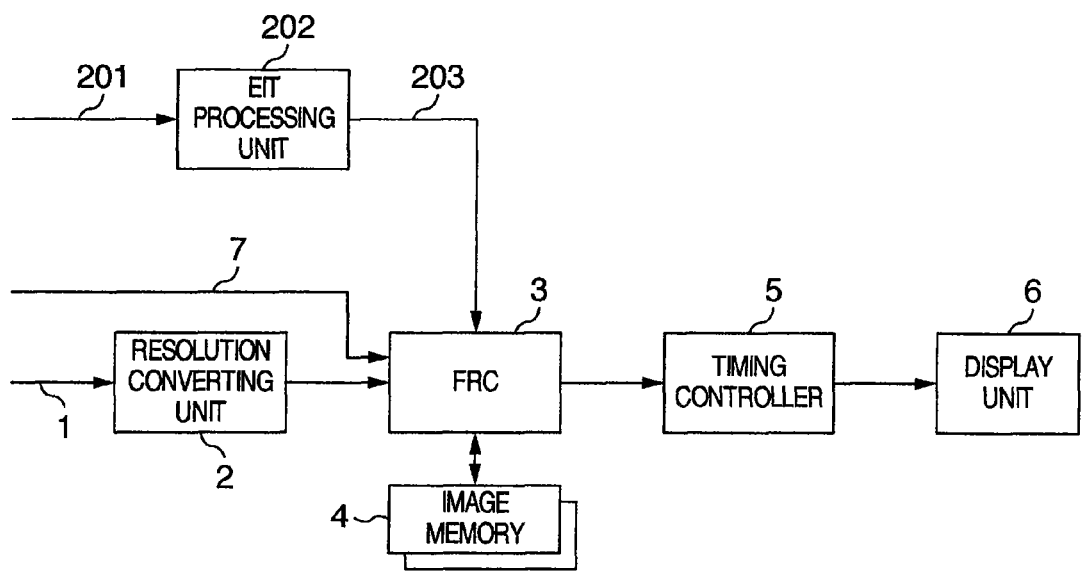
FIG. 20 is a block diagram for showing an arrangement of an image processing apparatus according to a fourth embodiment of the present invention.

FIG. 20 shows a fourth embodiment of the present invention. It should be noted that the same reference numerals indicated in other drawings will be employed as those for denoting the same structural elements shown in FIG. 20, and descriptions thereof will be omitted. The fourth embodiment is featured by that the present interpolating method is switched to an optimum interpolating method in response to genres of such programs as sports, news, and movie. Referring now to FIG. 20 and FIG. 21, a detailed description will be made of the fourth embodiment by mainly considering different portions from those of the above-described first embodiment.

In BS/CS/ ground-based digital television broadcasting systems, various sorts of information (for instance, titles of programs, contents of programs, program broadcasting dates, broadcast starting times for programs, broadcast continuing times for programs, broadcast channels, program genre codes etc.) related to programs other than picture/sound/data broadcastings have also been transmitted by being superimposed on electromagnetic waves. In BS/CS/ ground-based digital television broadcast receiving apparatuses, electronic program table functions have been provided with respect to users by utilizing program information called as "EIT (Event Information Table)" transmitted from broadcasting stations. In this fourth embodiment, an EIT data processing unit 202 for controlling the FRC 3 by employing the above-described EIT is provided. Concretely speaking, the EIT data processing unit 202 judges that a program of a television signal under reception corresponds to which genre by employing a 1-byte program genre code which is being used in a content descriptor within a received EIT, and then, produces an EIT judging signal 203 corresponding to the judged genre. FIG. 21 indicates an example as to a corresponding relationship between genres of programs and EIT judging signals 203. The EIT data processing unit 202 selects such an EIT judging signal 203 corresponding to a received program with reference to, for instance, a table which holds the corresponding relationship of FIG. 21. This selected EIT judging signal 203 is outputted to the FRC 3 as a control signal for controlling the FRC 3.

The system of this fourth embodiment is useful in such a case that 2 sorts of FRC conversion modes have been mounted, namely, in a first FRC conversion mode, for instance, when a content having a frame rate of 60 Hz is inputted, a frame stream of 120 Hz is produced; and in a second FRC conversion mode, when a content having a frame rate of 24 Hz is inputted, a frame stream of 60 Hz is produced. In the fourth embodiment, as represented in FIG. 21, the above-described table is constructed in the following manner: That is, as shown in FIG. 21, if a received program corresponds to a genre having the frame rate of 60 Hz, then "0" is outputted as the EIT judging signal 203, whereas if a received program corresponds to such a genre having a higher possibility of the frame rate of 24 Hz such as an animation and a movie, then "1" is outputted as the EIT judging signal 203.

Then, when the EIT judging signal 203 is "0", such an interpolation frame using the motion vector shown in FIG. 3, or FIG. 4 is produced and a frame rate converting operation is carried out. When the EIT judging signal 203 is "1", an interpolation frame without a motion vector is also produced by the frame slide system, or the linear interpolation system, and then, a frame rate converting operation is carried out.

As previously described, in this fourth embodiment, the interpolation systems can be switched in response to the genre data of the program which is viewed by the user.

It should also be understood that in this fourth embodiment, the program genres have been classified into 8 sorts of genres, but the present invention is not limited only thereto. For instance, alternatively, while these 8 classifications may be employed as a major classification, a plurality of sub-classifications belonging to the major classifications may be set, so that the interpolating methods may be switched in response to the more precise program genre.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. A picture signal processing apparatus comprising:
a motion vector detecting unit for detecting a first motion vector information pixel by pixel from a plurality of frames contained in an input picture signal;
an interpolation frame producing unit for producing an interpolation frame, which is configured to execute a plurality of interpolation frame producing processes including a first interpolation frame producing process based on the first motion vector information, and a second interpolation frame producing process based on a second motion vector information which is calculated from a histogram of the first motion vector information for a plurality of pixels in a frame; and
a frame stream producing unit for producing a picture signal of a new frame stream including an interpolation frame produced by the first interpolation frame producing process, an interpolation frame produced by the second interpolation frame producing process, and the frames of said input picture signal; wherein:
said frame stream producing unit keeps two or more interpolation frames produced by said first interpolation frame producing process not continued in a temporal manner in said new frame stream producing process; wherein:
said interpolation frame producing unit changes said interpolation frame producing process based on whether the format of said input picture signal is a non-pull down format or a 2-to-3 pull down format.

2. A picture signal processing apparatus comprising:
a motion vector detecting unit for detecting a motion vector information from a plurality of frames contained in an input picture signal;
an interpolation frame producing unit for producing an interpolation frame; and
a frame stream producing unit for producing a picture signal of a new frame stream by combining the interpolation frame produced by said interpolation frame producing unit with the frames of said input picture signal so as to output the produced picture signal of the new frame stream; wherein:
in the case that said input picture signal has a predetermined format including a first frame and a second frame having different picture contents from each other, said interpolation frame producing unit produces both a first interpolation frame and a second interpolation frame;
said frame stream producing unit replaces (a) frame(s) between said first frame and said second frame by said first interpolation frame and second interpolation frame so as to produce a new frame stream picture signal;
said interpolation frame producing unit is configured to change a method for producing at least any one of said first interpolation frame and said second interpolation frame among the plurality of interpolation frame producing methods including a first interpolation frame producing method based on a first motion vector information detected pixel by pixel and a second interpolation frame producing method based on a second motion vector information calculated from a histogram of the first motion vector information for a plurality of pixels in a frame; and
said frame stream producing unit keeps two or more first interpolation frames; wherein:
said picture signal having said predetermined format is a 2-to-3 pull down format picture signal;
wherein:
a method for producing an interpolation frame is further changed based upon a genre of a program indicated by an input picture signal.

* * * * *